United States Patent
Krolak

(10) Patent No.: US 9,379,419 B2
(45) Date of Patent: Jun. 28, 2016

(54) ACTIVE THERMAL MANAGEMENT AND THERMAL RUNAWAY PREVENTION FOR HIGH ENERGY DENSITY LITHIUM ION BATTERY PACKS

(71) Applicant: THE BOEING COMPANY, Chicago, IL (US)

(72) Inventor: Matthew J. Krolak, Renton, WA (US)

(73) Assignee: THE BOEING COMPANY, Chicago, IL (US)

(*) Notice: Subject to any disclaimer, the term of this patent is extended or adjusted under 35 U.S.C. 154(b) by 193 days.

(21) Appl. No.: 13/893,202

(22) Filed: May 13, 2013

(65) Prior Publication Data

US 2014/0335381 A1    Nov. 13, 2014

(51) Int. Cl.
| | |
|---|---|
| *H01M 10/613* | (2014.01) |
| *H01M 10/0525* | (2010.01) |
| *H01M 10/48* | (2006.01) |
| *H01M 10/6567* | (2014.01) |
| *H01M 10/659* | (2014.01) |
| H01M 10/6568 | (2014.01) |

(52) U.S. Cl.
CPC ...... *H01M 10/5004* (2013.01); *H01M 10/0525* (2013.01); *H01M 10/486* (2013.01); *H01M 10/613* (2015.04); *H01M 10/659* (2015.04); *H01M 10/6567* (2015.04); *H01M 10/6568* (2015.04); *Y02E 60/122* (2013.01)

(58) Field of Classification Search
CPC .................. H01M 10/5004; H01M 10/5089; H01M 10/486; H01M 10/5075; H01M 10/5077
USPC .......................................................... 429/50
See application file for complete search history.

(56) References Cited

U.S. PATENT DOCUMENTS

| | | | |
|---|---|---|---|
| 4,117,387 A | | 9/1978 | Windisch et al. |
| 4,215,307 A | * | 7/1980 | Windisch et al. ............. 320/107 |
| 4,604,564 A | * | 8/1986 | Windisch et al. ............. 320/107 |

(Continued)

FOREIGN PATENT DOCUMENTS

| | | |
|---|---|---|
| GB | 2295264 A | 5/1996 |
| JP | H1140211 A | 2/1999 |
| WO | 2012003209 A1 | 1/2012 |

OTHER PUBLICATIONS

Thermal Management of Batteries in Advanced Vehicles Using Phase-Change Materials, http://www.nrel.gov/vehiclesandfuels/energystorage/pdfs/42544.pdf.

(Continued)

*Primary Examiner* — Stewart Fraser
(74) *Attorney, Agent, or Firm* — Vista Law Group LLP; Cynthia A. Dixon

(57) ABSTRACT

The present disclosure provides a system, method, and apparatus for battery thermal management. In one or more embodiments, the disclosed method involves sensing, with at least one temperature sensor, a temperature of at least one battery cell, where at least one battery cell is at least partially submerged within a liquid contained within a battery case. The method further involves comparing the temperature of at least one battery cell with a maximum threshold temperature, and commanding a cooling unit to be activated when at least one processor determines that the temperature of at least one battery cell is above the maximum threshold temperature. Further, the method involves circulating, by at least one pump, the liquid via tubing from the battery case to the cooling unit back to the battery case.

17 Claims, 5 Drawing Sheets

(56) References Cited

U.S. PATENT DOCUMENTS

| | | | |
|---|---|---|---|
| 8,082,743 B2 | 12/2011 | Hermann et al. | |
| 2010/0136391 A1* | 6/2010 | Prilutsky et al. | 429/62 |
| 2010/0212338 A1* | 8/2010 | Hermann et al. | 62/118 |
| 2012/0003515 A1* | 1/2012 | Eisenhour | 429/62 |

OTHER PUBLICATIONS

Ford Focus Electric to Have 100-mile Range, Active Liquid Cooling for Battery Pack, Brandon Hill (Blog), Sep. 2, 2010, http://www.dailytech.com/Ford+Focus+Electric+to+Have+100mile+Range+Active+Liquid+Cooling+for+Battery+Pack/article19532.htm.

A123 Systems Outs New Breakthrough in Lithium-Ion Battery Technology, Shane McGlaun (Blog), Jun. 13, 2012, http://dailytech.com/A123+Systems+Outs+New+Breakthrough+in+LithiumIon+Battery+Technology/article24919.htm.

International Search Report, International Application No. PCT/US2014/031004, Sep. 23, 2014.

\* cited by examiner

ACTIVE THERMAL MANAGEMENT AND THERMAL RUNAWAY PREVENTION FOR HIGH ENERGY DENSITY LITHIUM ION BATTERY PACKS

BACKGROUND

The present disclosure relates to thermal management as well as thermal runaway prevention. In particular, it relates to active thermal management and thermal runaway prevention for high energy density lithium ion battery packs.

Lithium ion battery cells and battery packs have two primary concerns with respect to thermal management that must be addressed in order to ensure safety and long life. The first concern is that the individual battery cells must be maintained within their specified temperature range, and cell-to-cell temperature differences inside of the battery packs must be maintained in order to ensure long life and to maximize the battery pack value. The second concern is that faulty, damaged, or abused cells may enter thermal runaway (especially at elevated temperatures), thereby leading to compromised cells and battery, in a way typically not controlled for battery designs.

Currently, various schemes exist for cooling batteries that use liquids confined to pipes, tubes, or other channels where some portion of the individual battery cells are in contact with the fluid channel or have a path to reject heat to the channel, either through contact with a thermally conductive component (e.g., a heat spreader) or through direct contact with other battery cells. These methods typically have limited contact area with individual battery cells, have poor thermal conduction across the contact area, and may have several components through which heat from the battery cell must travel to reach the ultimate cooling fluid, thereby resulting in the limited ability to effectively remove heat. These measures introduce significant additional mass and volume to the battery pack that reduce the volume, weight, and effectiveness of the battery pack while increasing cost and frequently without providing significant protection from thermal runaway events.

Another existing solution is to embed individual battery cells into a solid material that changes phase at an elevated temperature, thus removing large quantities of heat in the process of melting without a corresponding increase in temperature above the melting point. While potentially beneficial in preventing thermal runaway from an individual cell, these solutions are either passive and allow heat in excess of that removed by convection from the case to accumulate up to the melting point of the phase change material, or require additional tubes and/or pipes to implement a traditional active management solution that add their associated weight and volume to the weight, volume, and cost of the phase change material itself. In either case, the possibility exists that the phase change material may already be in its molten state at the onset of thermal runaway, and therefore may not be able to provide any ability to protect against an undesired thermal event. Additionally, the manufacture of the bulk phase change material embedded in a binder matrix and the machining of the resulting bulk material into an appropriate shape for this application adds to the overall cost of the system.

Therefore, an improved system and method for thermal management and thermal runaway prevention for battery cells is needed.

SUMMARY

The present disclosure relates to a method, system, and apparatus for active (or passive) thermal management and thermal runaway prevention for high energy density lithium ion battery packs, in particular (or for battery packs of any chemistry that require cooling and thermal runaway protection, in general). The disclosed system for battery thermal management comprises a battery case and at least one battery cell. In one or more configurations, at least one battery cell is at least partially submerged within a liquid contained within the battery case. In at least one configuration, the system further comprises at least one pump to circulate the liquid via tubing from the battery case to a cooling unit back to the battery case.

In one or more configurations, the disclosed method for battery thermal management involves sensing, with at least one temperature sensor, a temperature of at least one battery cell. In one or more configurations, at least one battery cell is at least partially submerged within a liquid contained within a battery case. The method further involves comparing, with at least one processor, the temperature of at least one battery cell with a maximum threshold temperature. Also, the method involves commanding, by at least one processor, a cooling unit to be activated when at least one processor determines that the temperature of at least one battery cell is above the maximum threshold temperature. Further the method involves circulating, by at least one pump, the liquid via tubing from the battery case to the cooling unit back to the battery case.

In one or more configurations, the method further involves comparing, with at least one processor, the temperature of at least one battery cell with a minimum threshold temperature. Further, the method involves commanding, by at least one processor, the cooling unit to be deactivated when at least one processor determines that the temperature of at least one battery cell is below the minimum threshold temperature.

In at least one configuration, a pressure relief valve is connected to the battery case. In some configurations, the pressure relief valve is spring-loaded. In at least one configuration, a vent is connected to the pressure relief valve.

In one or more configurations, at least one of the battery cells is a lithium-ion battery cell. In at least one configuration, the cooling unit is associated with a fan. In some configurations, the liquid is a phase change material (PCM). In one or more configurations, at least one of the temperature sensors is located on at least one battery cell, located inside an interior of the battery case, and/or located on the battery case.

In at least one configuration, a system for battery thermal management comprises a battery case and at least one battery cell. In one or more configurations, at least one battery cell is at least partially submerged within a liquid contained within the battery case. The system further comprises at least one temperature sensor to sense a temperature of at least one battery cell. In addition, the system comprises at least one processor to compare the temperature of at least one battery cell with a maximum threshold temperature, and to command a cooling unit to be activated when at least one processor determines that the temperature of at least one battery cell is above the maximum threshold temperature. The system also comprises at least one pump to circulate the liquid via tubing from the battery case to the cooling unit back to the battery case.

In one or more configurations, at least one processor is further to compare the temperature of at least one battery cell with a minimum threshold temperature, and to command the cooling unit to be deactivated when at least one processor determines that the temperature of at least one battery cell is below the minimum threshold temperature.

In at least one configuration, a method for battery thermal management involves sensing, with at least one temperature sensor, a temperature of at least one battery cell. In one or more configurations, at least one battery cell is at least partially submerged within a first liquid contained within the battery case. The method further involves comparing, with at least one processor, the temperature of at least one battery cell with a maximum threshold temperature. Also, the method involves commanding, by at least one processor, a cooling unit to be activated when at least one processor determines that the temperature of at least one battery cell is above the maximum threshold temperature. In addition, the method involves circulating, by at least one pump, a second liquid via tubing from a heat exchanger located in the battery case to the cooling unit back to the heat exchanger.

In one or more configurations, the first liquid and/or the second liquid is a phase change material (PCM).

In at least one configuration, a system for battery thermal management comprises a battery case and at least one battery cell. In at least one configuration, at least one battery cell is at least partially submerged within a first liquid contained within the battery case. The system further comprises at least one temperature sensor to sense a temperature of at least one battery cell. In addition, the system comprises at least one processor to compare the temperature of at least one battery cell with a maximum threshold temperature, and to command a cooling unit to be activated when at least one processor determines that the temperature of at least one battery cell is above the maximum threshold temperature. Further, the system comprises at least one pump to circulate a second liquid via tubing from a heat exchanger located in the battery case to the cooling unit back to the heat exchanger.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

DESCRIPTION

Figure 1:
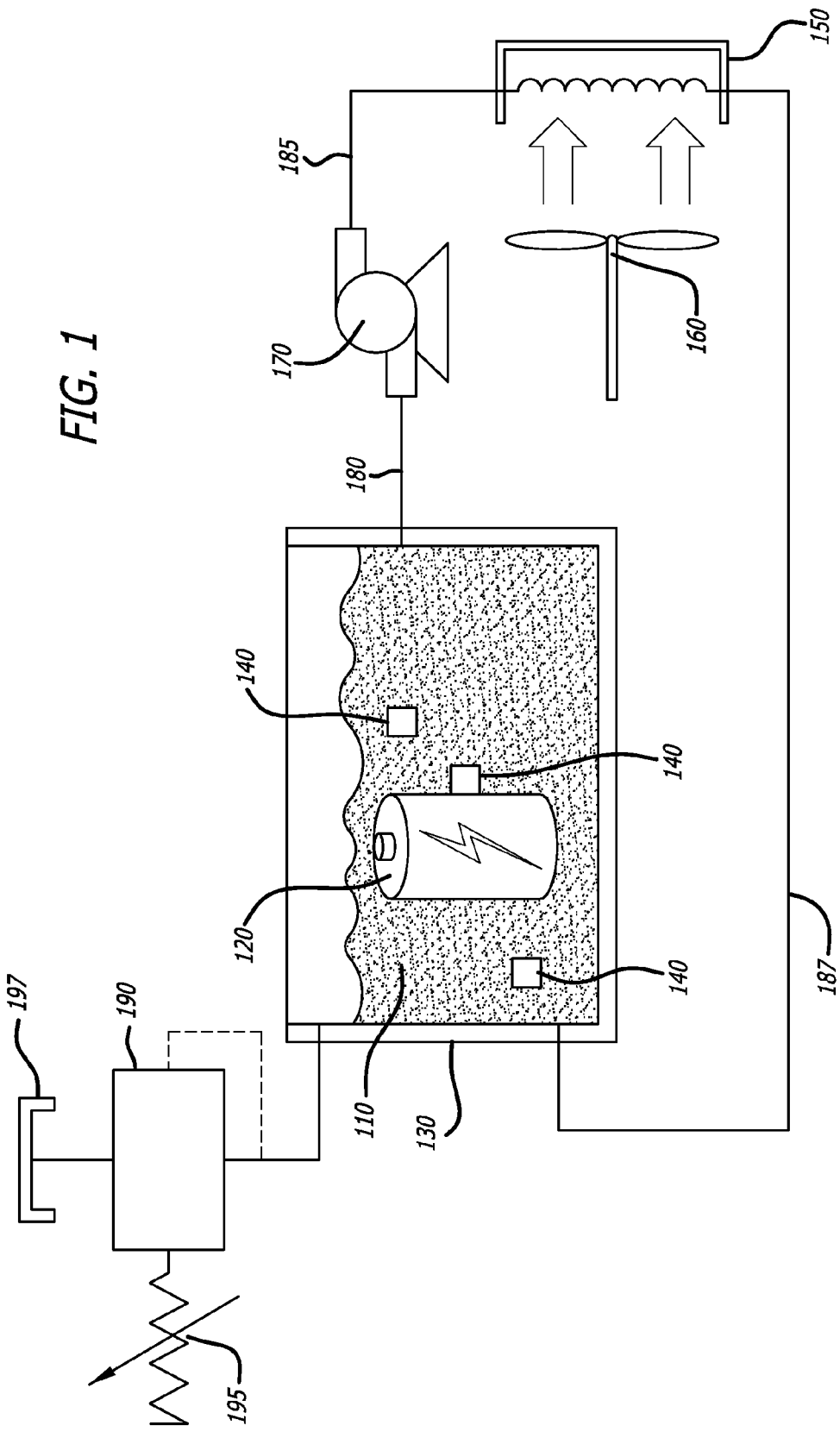
FIG. 1 is a schematic diagram of the system for active thermal management and thermal runaway prevention for high energy density lithium ion battery packs, where the coolant is circulated throughout the system, in accordance with at least one embodiment of the present disclosure.

The methods and apparatus disclosed herein provide an operative system for active thermal management and thermal runaway prevention for high energy density lithium ion battery packs. Specifically, this system provides battery thermal runaway prevention and active fluid immersion cooling for lithium-ion (or other chemistry) battery cells with improved thermal performance and the ability to prevent or quench thermal runaway in damaged or abused cells for safety improvement and battery life extension with small volume and light weight.

The system of the present disclosure addresses two primary concerns with respect to thermal battery management to ensure safety and long life of a battery. These two primary concerns are: (1) to maintain a uniform temperature range between the battery cells, and (2) to control and isolate damaged or abused battery cells from entering into a thermal runaway condition.

In particular, the disclosed system employs direct fluid immersion that puts nearly the entire surface area of the battery cell in good, direct thermal contact with the ultimate cooling medium without incurring any of the mass, weight, volume, or cost associated with tubing, heat spreaders, support structures, or phase change material associated with any of the other solutions. Fluids with boiling points chosen appropriately can perform the function of the phase change materials without incurring any additional mass, volume, or cost and can safely and completely remove all of the energy associated with a battery cell that might fail catastrophically otherwise. Battery cells can be packed tightly together, reducing the overall volume of the battery without sacrificing thermal conduction of the battery cell to the fluid or risking a thermal runaway event spreading from battery cell to cell.

This system can operate at atmospheric pressure and, thus, puts no additional mechanical stress on individual battery cells, and requires no additional mass or reinforcement of the battery container that would be required of a pressure vessel. Fluid can be circulated through the battery with minimal effort in order to ensure uniform temperature distribution, and cooled with a standard heat exchanger in order to keep the battery well below the boiling point of the liquid, thus extending the usable life of the battery.

If pump power or other external sensors or actuator power is lost there is no loss of ability to prevent thermal runaway (i.e. a fail safe). Active circulation of fluid may not be required in some circumstances due to good thermal conduction to the battery case. The above approach describes either a single phase or two phase (boiling) cooling system; however, it is conceivable that the approach could be extended to implement refrigeration (heat pump) application where the battery cells could be spray cooled by expanding refrigerant. Depending on the coolant chosen, this could require significant pumping power to allow cooling over all conditions and may eliminate the fail-safe feature of the invention. Additionally, there is the potential for cooling the battery too much and damaging the cells through low temperature operation.

It should be noted that fluids are available commercially that are designed for heat transfer applications; which have boiling points appropriate to this application, have negligible toxicity (biologically inert), have no ozone depletion potential, have low greenhouse gas potential, are non-flammable, and have other mechanical properties favorable for this application. Fully implementing this solution is not dependent upon the development or discovery of any additional material or modification to the properties of any material not yet described or not yet widely available.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

FIG. 1 is a schematic diagram of the system 100 for active thermal management and thermal runaway prevention for high energy density lithium ion battery packs, where the coolant 110 is circulated throughout the system 100, in accordance with at least one embodiment of the present disclosure. In this figure, a plurality of battery cells 120 are submerged within a liquid 110 contained within a battery case 130. In one or more embodiments, the battery cells 120 are lithium-ion battery cells. It should be noted that in other embodiments, the battery cells 120 may be various different types of battery cells than lithium-ion battery cells. In one or more embodiments, the liquid 110 is a phase change material (PCM), such as a dielectric, non-conductive liquid (e.g., Novec by 3M or Fluorinert by 3M). At least one temperature sensor 140 is located in the battery case 130. The temperature sensor(s) 140 may be located on at least one of the battery cells 120, located inside the interior of the battery case 130, and/or located on the battery case 130 itself.

The temperature sensor(s) 140 senses the temperature of at least one of the battery cells 120. At least one processor (not shown in figure) compares the temperature of the battery cell(s) 120 with a maximum threshold temperature (e.g., this temperature may be a predefined maximum temperature specified by the manufacturer of the battery cells 120). If the processor(s) determines that the temperature of the battery cell(s) 120 is above the maximum threshold temperature, the processor(s) will command (e.g., by sending a command signal to) a cooling unit 150 to be activated (e.g., turned on). In one or more embodiments, the cooling unit 150 employs a radiator-type structure. In some embodiments, the cooling unit 150 also employs a fan 160 to aid in the cooling process.

A pump 170 is connected to the battery case 130 and connected to the cooling unit 150 by tubing 180, 185 (e.g., by pipes). The cooling unit 150 is also connected to the battery case 130 by tubing 187 (e.g., by pipes). The liquid 110 flows throughout the tubing 180, 185, 187. The pump 170 circulates the liquid 110 (via the tubing 180, 185, 187) from the battery case 130 to the cooling unit 150 and back to the battery case 130.

In addition, at least one processor (not shown) compares the temperature of the battery cell(s) 120 with a minimum threshold temperature (e.g., this temperature may be a predefined minimum temperature specified by the manufacturer of the battery cells 120). If the processor(s) determines that the temperature of the battery cell(s) 120 is below the minimum threshold temperature, the processor(s) will command (e.g., by sending a command signal to) a cooling unit 150 to be deactivated (e.g., turned off).

A pressure relief valve 190 is connected to the battery case 130. The pressure relief valve 190 is spring loaded 195 and has a vent 197. During normal operation, the pressure relief valve 190 remains closed. However, during an extreme situation (e.g., during a thermal runaway condition, which is when at least one of the battery cells 120 is experiencing thermal runaway), excess vapor produced in the battery case 130 will push open the pressure relief valve 190, and the vapor will escape through the vent 197 of the pressure relief valve 190.

Figure 2:
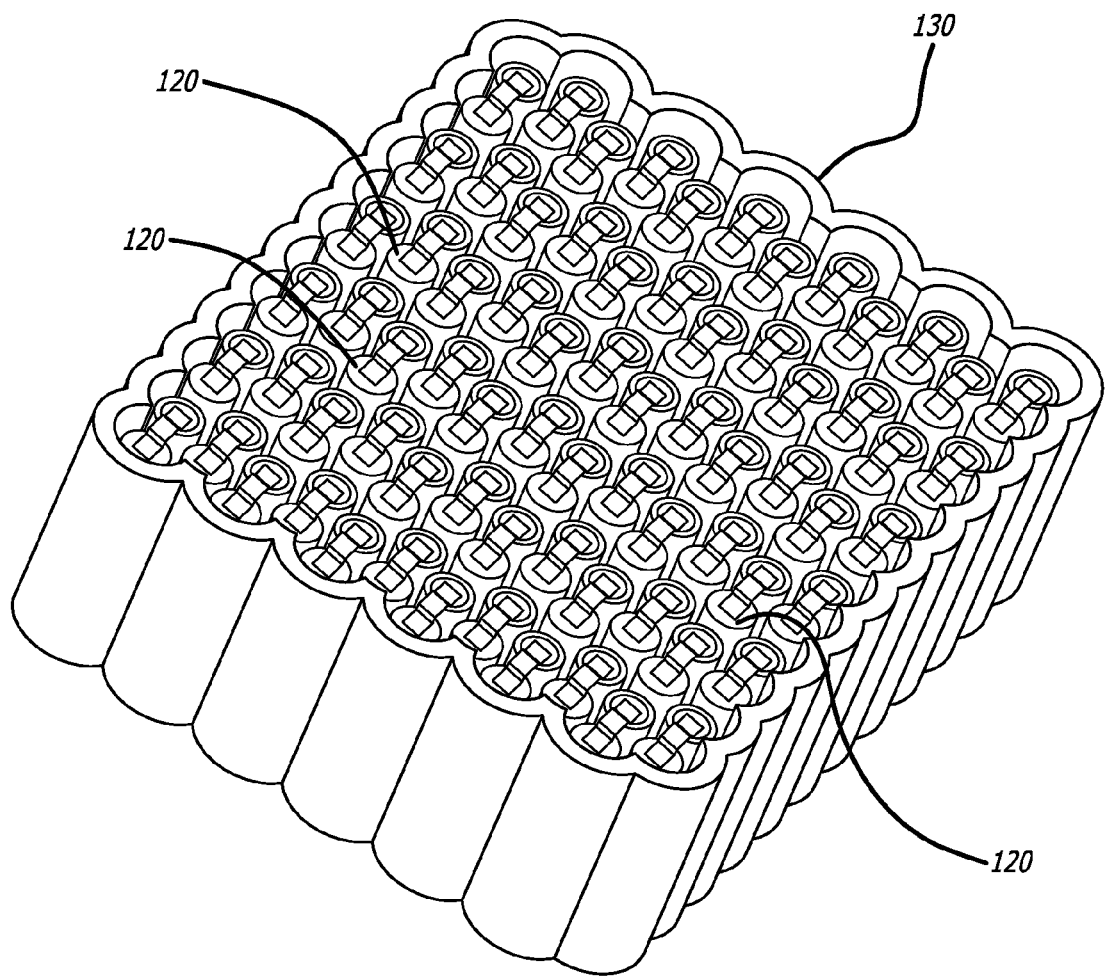
FIG. 2 is a diagram illustrating a plurality of battery cells immersed in a liquid contained in the battery case of the system of FIG. 1, in accordance with at least one embodiment of the present disclosure.

FIG. 2 is a diagram 200 illustrating a plurality of battery cells 120 immersed in a liquid contained in the battery case 130 of the system of FIG. 1, in accordance with at least one embodiment of the present disclosure. This figure illustrates one exemplary configuration of the battery cells 120 contained within the battery case 130 that the disclosed system 100 may employ. It should be noted that in other embodiments, various different types of configurations of the battery cells 120 within the battery case 130 may be employed.

Figure 3:
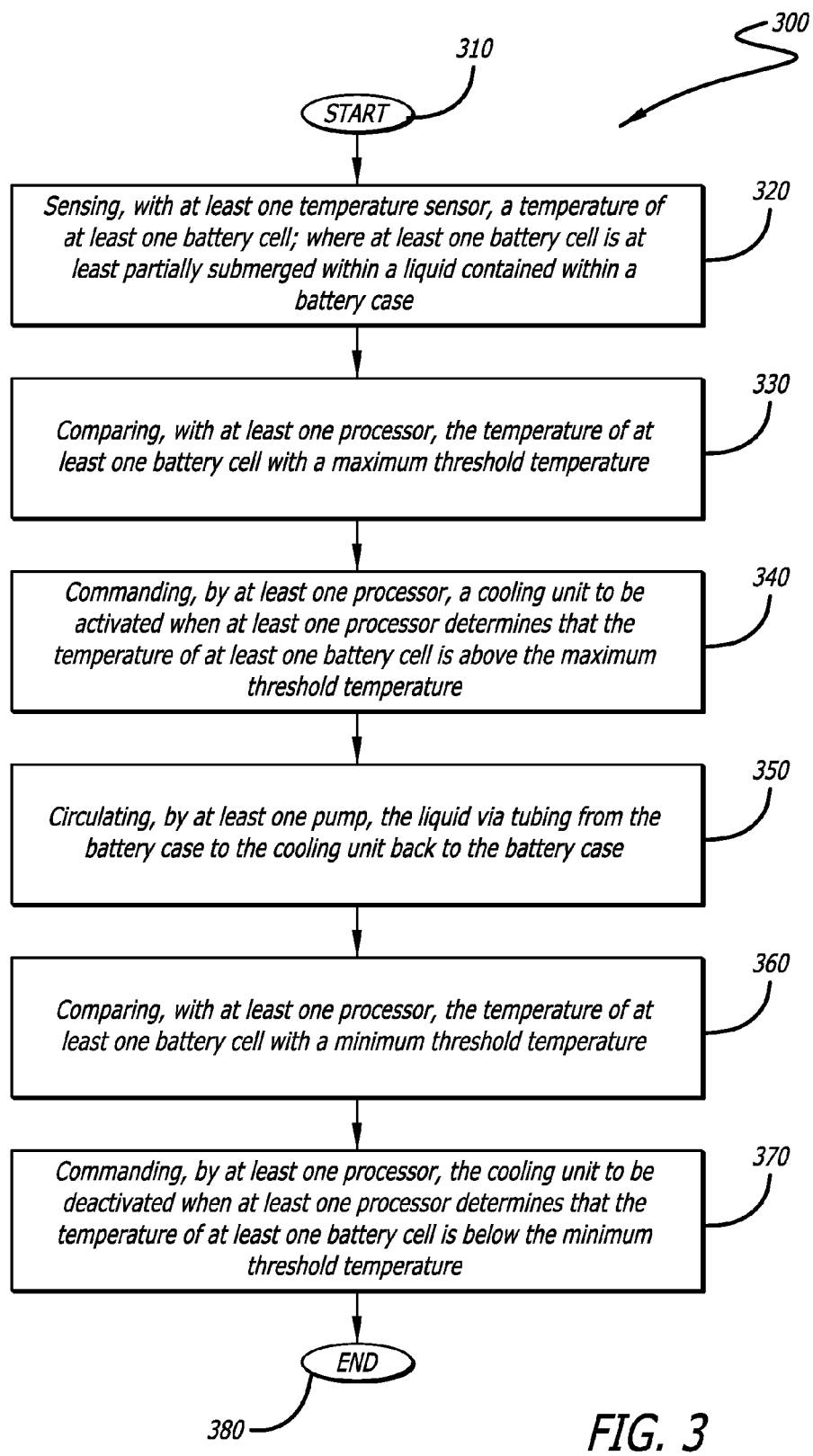
FIG. 3 is a flow chart for the disclosed method for active thermal management and thermal runaway prevention for high energy density lithium ion battery packs for the system of FIG. 1, in accordance with at least one embodiment of the present disclosure.

FIG. 3 is a flow chart for the disclosed method 300 for active thermal management and thermal runaway prevention for high energy density lithium ion battery packs for the system 100 of FIG. 1, in accordance with at least one embodiment of the present disclosure. At the start 310 of the method 300, at least one temperature sensor senses a temperature of at least one battery cell 320. The battery cell(s) is at least partially submerged within a liquid contained within a battery case. Then, at least one processor compares the temperature of the battery cell(s) with a maximum temperature threshold 330. If the processor determines that the temperature of the battery cell(s) is above the maximum temperature threshold, the processor(s) commands a cooling unit to be activated 340. At least one pump circulates the liquid via tubing from the battery case to the cooling unit back to the battery case 350.

Then, at least one processor compares the temperature of the battery cell(s) with a minimum temperature threshold 360. If the processor determines that the temperature of the battery cell(s) is below the minimum temperature threshold, the processor(s) commands the cooling unit to be deactivated 370. Then, the method 300 ends 380.

It should be noted that in other embodiments, more or less steps than shown for the method 300 of FIG. 3 may be performed. In addition, the steps shown in the method 300 of FIG. 3 may be performed in various different orders than as is shown in FIG. 3.

Figure 4:
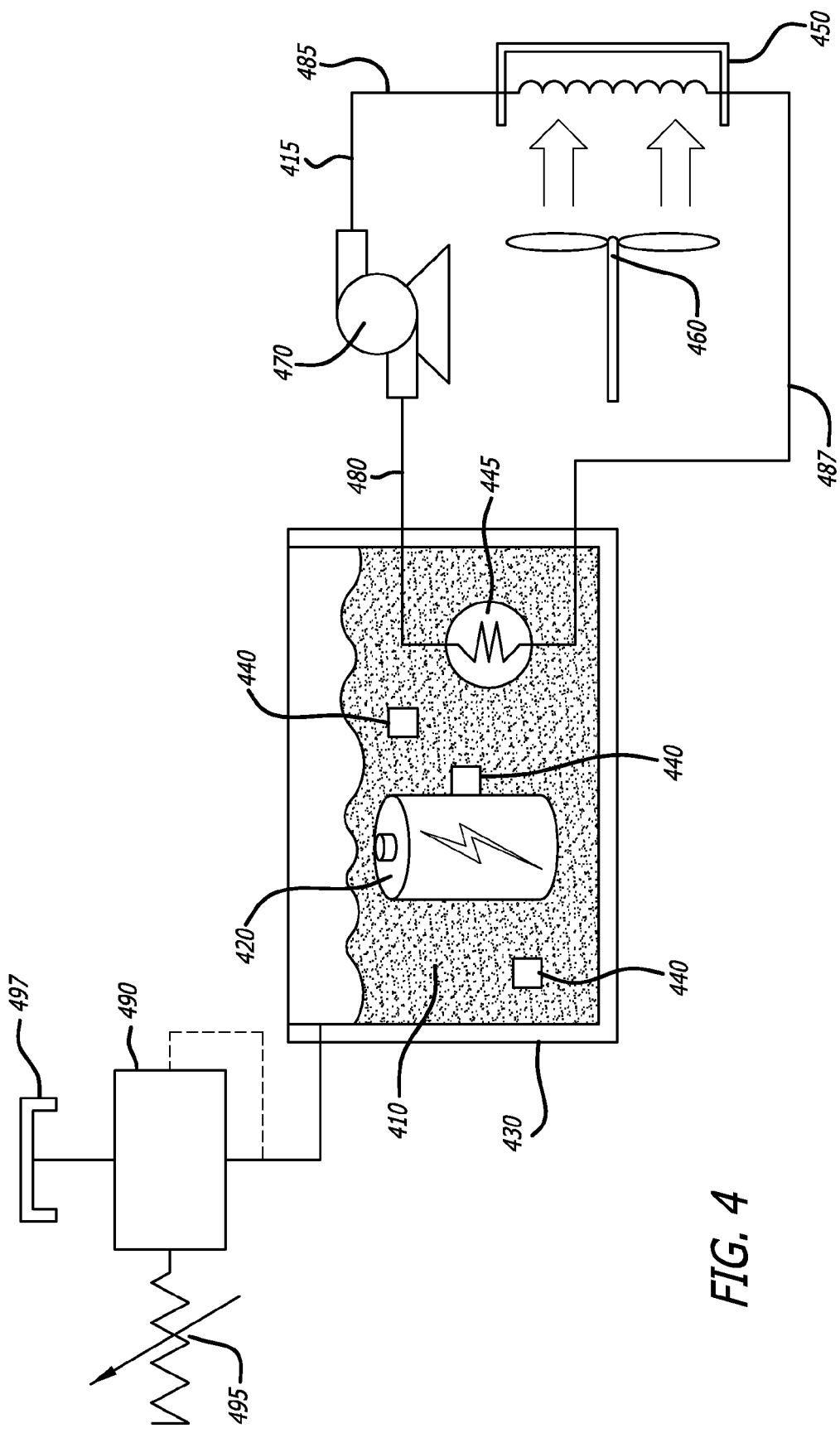
FIG. 4 is a schematic diagram of the system for active thermal management and thermal runaway prevention for high energy density lithium ion battery packs, where the coolant is not circulated throughout the system, in accordance with at least one embodiment of the present disclosure.

FIG. 4 is a schematic diagram of the system 400 for active thermal management and thermal runaway prevention for high energy density lithium ion battery packs, where the coolant 410 (i.e. a "first liquid") is not circulated throughout the 400 system, in accordance with at least one embodiment of the present disclosure. In this figure, a plurality of battery cells 420 are submerged within a liquid 410 (i.e. the "first liquid") contained within a battery case 430. In one or more embodiments, the battery cells 420 are lithium-ion battery cells. It should be noted that in other embodiments, the battery cells 420 may be various different types of battery cells than lithium-ion battery cells. In one or more embodiments, the liquid 410 is a phase change material (PCM), such as a dielectric, non-conductive liquid (e.g., Novec by 3M or Fluorinert by 3M). At least one temperature sensor 440 is located in the battery case 430. The temperature sensor(s) 440 may be located on at least one of the battery cells 420, located inside the interior of the battery case 430, and/or located on the battery case 430 itself.

The temperature sensor(s) 440 senses the temperature of at least one of the battery cells 420. At least one processor (not shown in figure) compares the temperature of the battery cell(s) 420 with a maximum threshold temperature (e.g., this temperature may be a predefined maximum temperature specified by the manufacturer of the battery cells 420). If the processor(s) determines that the temperature of the battery cell(s) 420 is above the maximum threshold temperature, the processor(s) will command (e.g., by sending a command signal to) a cooling unit 450 to be activated (e.g., turned on). In one or more embodiments, the cooling unit 450 employs a radiator-type structure. In some embodiments, the cooling unit 450 also employs a fan 460 to aid in the cooling process.

A pump 470 is connected to a heat exchanger 445 and connected to the cooling unit 450 by tubing 480, 485 (e.g., by pipes). The heat exchanger 445 is located in the interior of the battery case 430 or on the battery case 430 itself. The cooling unit 450 is also connected to the heat exchanger 445 by tubing 487 (e.g., by pipes). A liquid 415 (i.e. a "second liquid") flows throughout the tubing 480, 485, 487. The liquid 415 is a phase change material (PCM), such as a dielectric, non-conductive liquid (e.g., Novec by 3M or Fluorinert by 3M). The pump 470 circulates the liquid 415 (via the tubing 480, 485, 487) from the heat exchanger 445 to the cooling unit 450 and back to the heat exchanger 445.

Also, at least one processor (not shown) compares the temperature of the battery cell(s) 420 with a minimum threshold temperature (e.g., this temperature may be a predefined minimum temperature specified by the manufacturer of the battery cells 420). If the processor(s) determines that the temperature of the battery cell(s) 420 is below the minimum threshold temperature, the processor(s) will command (e.g., by sending a command signal to) a cooling unit 450 to be deactivated (e.g., turned off).

A pressure relief valve 490 is connected to the battery case 430. The pressure relief valve 490 is spring loaded 495 and has a vent 497. During normal operation, the pressure relief valve 490 remains closed. However, during an extreme situation (e.g., during a thermal runaway condition, which is when at least one of the battery cells 420 is experiencing thermal runaway), excess vapor produced in the battery case 430 will push open the pressure relief valve 490, and the vapor will escape through the vent 497 of the pressure relief valve 490.

Figure 5:
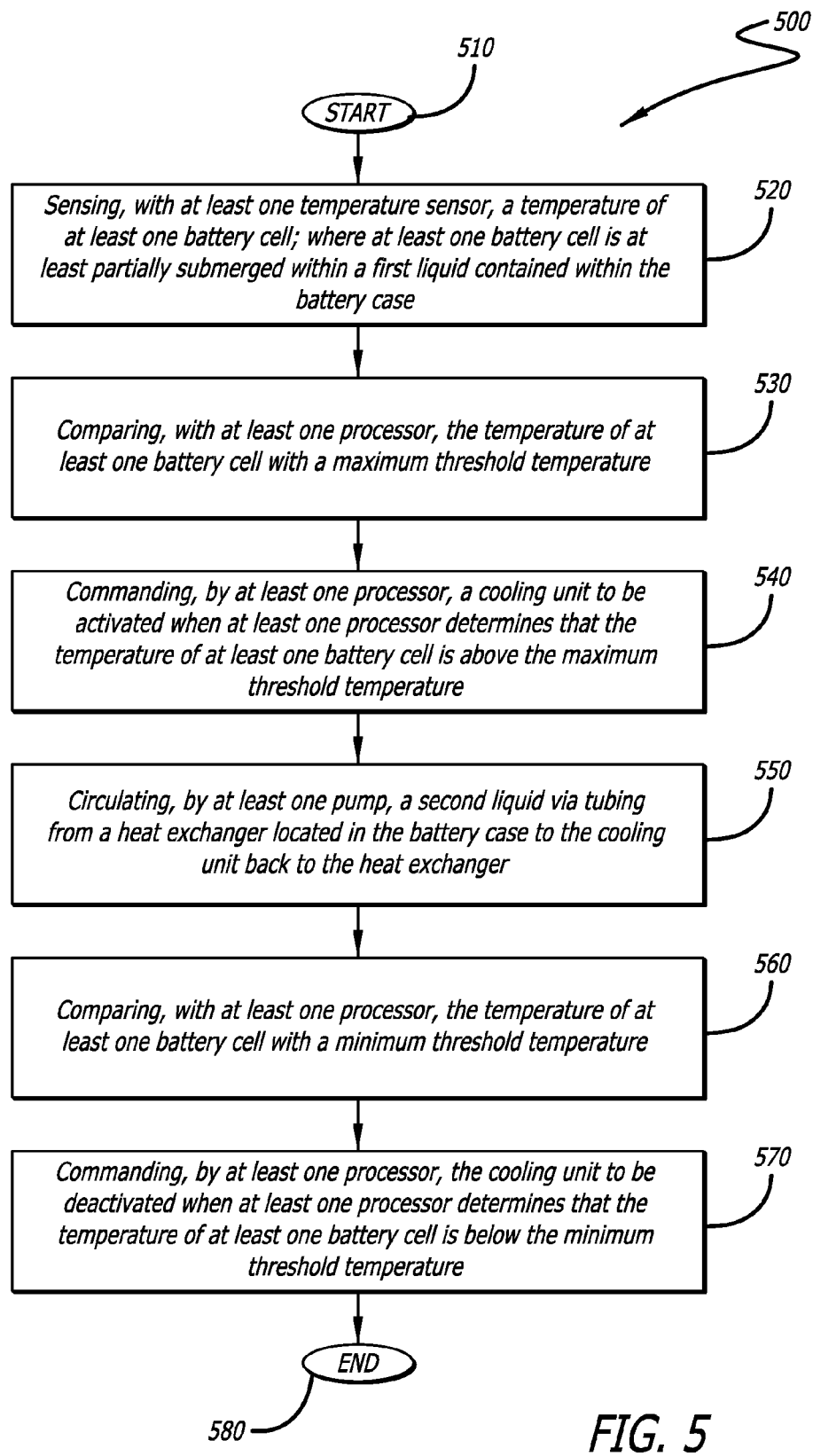
FIG. 5 is a flow chart for the disclosed method for active thermal management and thermal runaway prevention for high energy density lithium ion battery packs for the system of FIG. 4, in accordance with at least one embodiment of the present disclosure.

FIG. 5 is a flow chart for the disclosed method 500 for active thermal management and thermal runaway prevention for high energy density lithium ion battery packs for the system 400 of FIG. 4, in accordance with at least one embodiment of the present disclosure. At the start 510 of the method 500, at least one temperature sensor senses a temperature of at least one battery cell 520. The battery cell(s) is at least partially submerged within a first liquid contained within a battery case. Then, at least one processor compares the temperature of the battery cell(s) with a maximum temperature threshold 530. If the processor determines that the temperature of the battery cell(s) is above the maximum temperature threshold, the processor(s) commands a cooling unit to be activated 540. At least one pump circulates a second liquid via tubing from a heat exchanger to the cooling unit back to the heat exchanger 550.

Then, at least one processor compares the temperature of the battery cell(s) with a minimum temperature threshold 560. If the processor determines that the temperature of the battery cell(s) is below the minimum temperature threshold, the processor(s) commands the cooling unit to be deactivated 570. Then, the method 500 ends 580.

It should be noted that in other embodiments, more or less steps than shown for the method 500 of FIG. 5 may be performed. In addition, the steps shown in the method 500 of FIG. 5 may be performed in various different orders than as is shown in FIG. 5.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A system for battery thermal management, the system comprising:
    a battery case;
    at least one battery cell, wherein the at least one battery cell is at least partially submerged within a liquid contained within the battery case;
    at least one pump to circulate the liquid via tubing from the battery case to a cooling unit back to the battery case, wherein the liquid is a phase change material (PCM); and
    a pressure relief valve connected to the battery case.

2. A method for battery thermal management, the method comprising:
    sensing, with at least one temperature sensor, a temperature of at least one battery cell,
    wherein the at least one battery cell is at least partially submerged within a liquid contained within a battery case;
    comparing, with at least one processor, the temperature of the at least one battery cell with a maximum threshold temperature;
    commanding, by the at least one processor, a cooling unit to be activated when the at least one processor determines that the temperature of the at least one battery cell is above the maximum threshold temperature; and
    circulating, by at least one pump, the liquid via tubing from the battery case to the cooling unit back to the battery case,
    wherein the liquid is a phase change material (PCM),
    wherein a pressure relief valve is connected to the battery case.

3. The method of claim 2, wherein the method further comprises:
    comparing, with the at least one processor, the temperature of the at least one battery cell with a minimum threshold temperature; and
    commanding, by the at least one processor, the cooling unit to be deactivated when the at least one processor determines that the temperature of the at least one battery cell is below the minimum threshold temperature.

4. The method of claim 2, wherein the pressure relief valve is spring-loaded.

5. The method of claim 2, wherein a vent is connected to the pressure relief valve.

6. The method of claim 2, wherein at least one of the at least one battery cell is a lithium-ion battery cell.

7. The method of claim 2, wherein the cooling unit is associated with a fan.

8. The method of claim 2, wherein at least one of the at least one temperature sensor is at least one of located on the at least one battery cell, located inside an interior of the battery case, and located on the battery case.

9. A system for battery thermal management, the system comprising:
    a battery case;
    at least one battery cell, wherein the at least one battery cell is at least partially submerged within a liquid contained within the battery case;
    at least one temperature sensor to sense a temperature of the at least one battery cell;
    at least one processor to compare the temperature of the at least one battery cell with a maximum threshold temperature, and to command a cooling unit to be activated when the at least one processor determines that the temperature of the at least one battery cell is above the maximum threshold temperature;
    at least one pump to circulate the liquid via tubing from the battery case to the cooling unit back to the battery case, wherein the liquid is a phase change material (PCM); and
    a pressure relief valve connected to the battery case.

10. The system of claim 9, wherein the at least one processor is further to compare the temperature of the at least one battery cell with a minimum threshold temperature, and to command the cooling unit to be deactivated when the at least one processor determines that the temperature of the at least one battery cell is below the minimum threshold temperature.

11. The system of claim 9, wherein the pressure relief valve is spring-loaded.

12. The system of claim 9, wherein a vent is connected to the pressure relief valve.

13. The system of claim 9, wherein at least one of the at least one battery cell is a lithium-ion battery cell.

14. The system of claim 9, wherein the cooling unit is associated with a fan.

15. The system of claim 9, wherein at least one of the at least one temperature sensor is at least one of located on the at least one battery cell, located inside an interior of the battery case, and located on the battery case.

16. A method for battery thermal management, the method comprising:
   sensing, with at least one temperature sensor, a temperature of at least one battery cell,
   wherein the at least one battery cell is at least partially submerged within a first liquid contained within a battery case;
   comparing, with at least one processor, the temperature of the at least one battery cell with a maximum threshold temperature;
   commanding, by the at least one processor, a cooling unit to be activated when the at least one processor determines that the temperature of the at least one battery cell is above the maximum threshold temperature; and
   circulating, by at least one pump, a second liquid via tubing from a heat exchanger located in the battery case to the cooling unit back to the heat exchanger,
   wherein at least one of the first liquid and the second liquid is a phase change material (PCM),
   wherein a pressure relief valve is connected to the battery case.

17. A system for battery thermal management, the system comprising:
   a battery case;
   at least one battery cell, wherein the at least one battery cell is at least partially submerged within a first liquid contained within the battery case;
   at least one temperature sensor to sense a temperature of the at least one battery cell;
   at least one processor to compare the temperature of the at least one battery cell with a maximum threshold temperature, and to command a cooling unit to be activated when the at least one processor determines that the temperature of the at least one battery cell is above the maximum threshold temperature; and
   at least one pump to circulate a second liquid via tubing from a heat exchanger located in the battery case to the cooling unit back to the heat exchanger,
   wherein at least one of the first liquid and the second liquid is a phase change material (PCM); and
   a pressure relief valve connected to the battery case.

* * * * *